United States Patent
Korman et al.

(10) Patent No.: US 7,590,666 B2
(45) Date of Patent: Sep. 15, 2009

(54) PREDICTING CAPACITY CONSUMPTION IN A MEMORY COMPONENT

(75) Inventors: Stephen R. Korman, Seattle, WA (US); Elwood A. Anthony, Pacific, WA (US); Jiong Feng, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 273 days.

(21) Appl. No.: 11/454,592

(22) Filed: Jun. 16, 2006

(65) Prior Publication Data

US 2007/0294206 A1    Dec. 20, 2007

(51) Int. Cl.
G06F 17/30    (2006.01)
(52) U.S. Cl. ........................... 707/200; 707/205
(58) Field of Classification Search ............. 707/200, 707/205
See application file for complete search history.

(56) References Cited

U.S. PATENT DOCUMENTS

| | | | |
|---|---|---|---|
| 6,311,251 B1 | 10/2001 | Merritt et al. | |
| 6,401,121 B1* | 6/2002 | Yoshida et al. | 709/227 |
| 6,430,611 B1 | 8/2002 | Kita et al. | |
| 6,542,905 B1* | 4/2003 | Fogel et al. | 707/200 |
| 6,804,714 B1 | 10/2004 | Tummalapalli | |
| 6,898,634 B2 | 5/2005 | Collins et al. | |
| 6,947,935 B1* | 9/2005 | Horvitz et al. | 707/7 |
| 6,957,227 B2* | 10/2005 | Fogel et al. | 707/102 |
| 7,028,054 B2* | 4/2006 | Harper et al. | 707/200 |
| 2002/0116402 A1* | 8/2002 | Luke | 707/200 |
| 2003/0004973 A1* | 1/2003 | Harper et al. | 707/200 |
| 2003/0093439 A1* | 5/2003 | Mogi et al. | 707/200 |
| 2003/0191909 A1 | 10/2003 | Asano et al. | |
| 2004/0010501 A1* | 1/2004 | Anderson et al. | 707/100 |
| 2004/0117408 A1 | 6/2004 | Bharadwaj et al. | |
| 2004/0179528 A1* | 9/2004 | Powers et al. | 370/392 |
| 2004/0255140 A1* | 12/2004 | Margolus et al. | 713/193 |
| 2005/0015547 A1 | 1/2005 | Yokohata et al. | |
| 2005/0044454 A1 | 2/2005 | Moshayedi | |
| 2005/0120057 A1* | 6/2005 | Hashimoto et al. | 707/200 |
| 2005/0165854 A1* | 7/2005 | Burnett et al. | 707/200 |
| 2006/0020664 A1 | 1/2006 | Umeda | |
| 2006/0064438 A1* | 3/2006 | Aggarwal | 707/200 |
| 2006/0101084 A1* | 5/2006 | Kishi et al. | 707/200 |
| 2006/0282641 A1* | 12/2006 | Fujimoto et al. | 711/173 |
| 2007/0239948 A1* | 10/2007 | Muraki et al. | 711/162 |

OTHER PUBLICATIONS

Burleson, Donald K., "Oracle Database Trend Analysis Using Statspack", http://www.dba-oracle.com/art_Statspack_Trend.htm.
"HP Storage Works Reference Information Manager for Databases", http://h71028.www7.hp.com/ERC/downloads/4AA0-0753ENW.pdf.
"HP Storage Essentials integration with the HP OpenView suite", http://h71028.www7.hp.com/ERC/downloads/4AA0-3977ENW.pdf.

\* cited by examiner

*Primary Examiner*—Hung T Vy
*Assistant Examiner*—Kim T Nguyen

(57) ABSTRACT

Techniques and technologies are provided for predicting when remaining storage capacity of a memory component will be fully consumed. For example, the remaining storage capacity of the memory component can be determined and a rate of change of the storage capacity can be calculated. Using this information, a prediction or estimate can be made as to when the remaining storage capacity of the memory component will be fully consumed. The prediction or estimate can be based, for example, on a ratio of the remaining storage capacity to the rate of change of the storage capacity.

17 Claims, 5 Drawing Sheets

PREDICTING CAPACITY CONSUMPTION IN A MEMORY COMPONENT

BACKGROUND

Database management and administration is an extremely important yet difficult task. As database systems grow they become increasingly complex to manage. Some database systems utilize client management products, such as capacity planning products, to proactively monitor one or more client machines, especially in large enterprise configurations utilizing multiple machines dedicated to specific functions within the network. These capacity planning products require a skilled administrator to monitor the behavior of a database, and to adjust the hardware and software configuration in order to keep pace with growth. Among other things, the administrator's job can include continuous monitoring of the database's performance and knob tuning, as well as continuous reconfiguration, either to update the database resources or re-organize them in a different way.

Server databases, such as a Standard Query Language (SQL) database and other databases, use physical files and logical file groups to manage storage space of those databases. Due to normal growth patterns, these files and file groups can eventually become full. In an ideal situation, someone manually increases the size of these files or file groups. However, managing capacity levels of these files and file groups can be a difficult and time-consuming problem for data centers that have hundreds or even thousands of databases, with each database having many files and file groups. Existing solutions to this problem measure how full a storage area, such as a database or disk drive, is at a given time. These solutions merely convey how much capacity the storage area has left.

According to one technique, a database management engine has the ability to automatically grow a file after the database management engine determines that a database component is full. The database management engine grows the database component by a pre-set amount or by a predetermined percentage of its total capacity. This can reduce the likelihood of unexpected failure due, for example, to a file group running out of disk space. Such "auto growth" approaches have performance penalties, which can sometimes cause an application failure.

According to another technique, software-called "alerts" can provide a notification when a database or disk drive reaches a certain capacity level or "level of fullness" (e.g., 90 percent full). Due to a large number of false positives such alerts may not be useful. For instance, a slowly growing or shrinking database may remain 90 percent full indefinitely, without negative consequences.

SUMMARY

Techniques and technologies are provided which can allow for estimations, forecasts or predictions as to when a memory component will fill up or run out of capacity. These techniques and technologies can also provide an indication or warning which estimates, forecasts or predicts when a memory component will "fill up" or run out of capacity. For instance, in one implementation, a "time to capacity" alert mechanism is provided which utilizes a rate of capacity change in a memory component to estimate or predict when the memory component will become full, and can therefore proactively tell operators to address capacity issues before the memory component becomes full. Such techniques and technologies can help reduce and/or prevent application outage, which can thus help reduce, for example, a potential loss of time.

Techniques and technologies are provided for predicting when the remaining storage capacity of the memory component will be consumed. For example, the remaining storage capacity of the memory component can be determined and a rate of change of the storage capacity can be calculated. Using this information, a prediction or estimate can be made as to when the remaining storage capacity of the memory component will be consumed. The prediction or estimate can be based on a ratio of the remaining storage capacity to the rate of change of the storage capacity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The techniques and technologies for predicting when a memory component will become full and providing an indication of that prediction are further described with reference to the accompanying drawings in which.

DETAILED DESCRIPTION

Figure 1:
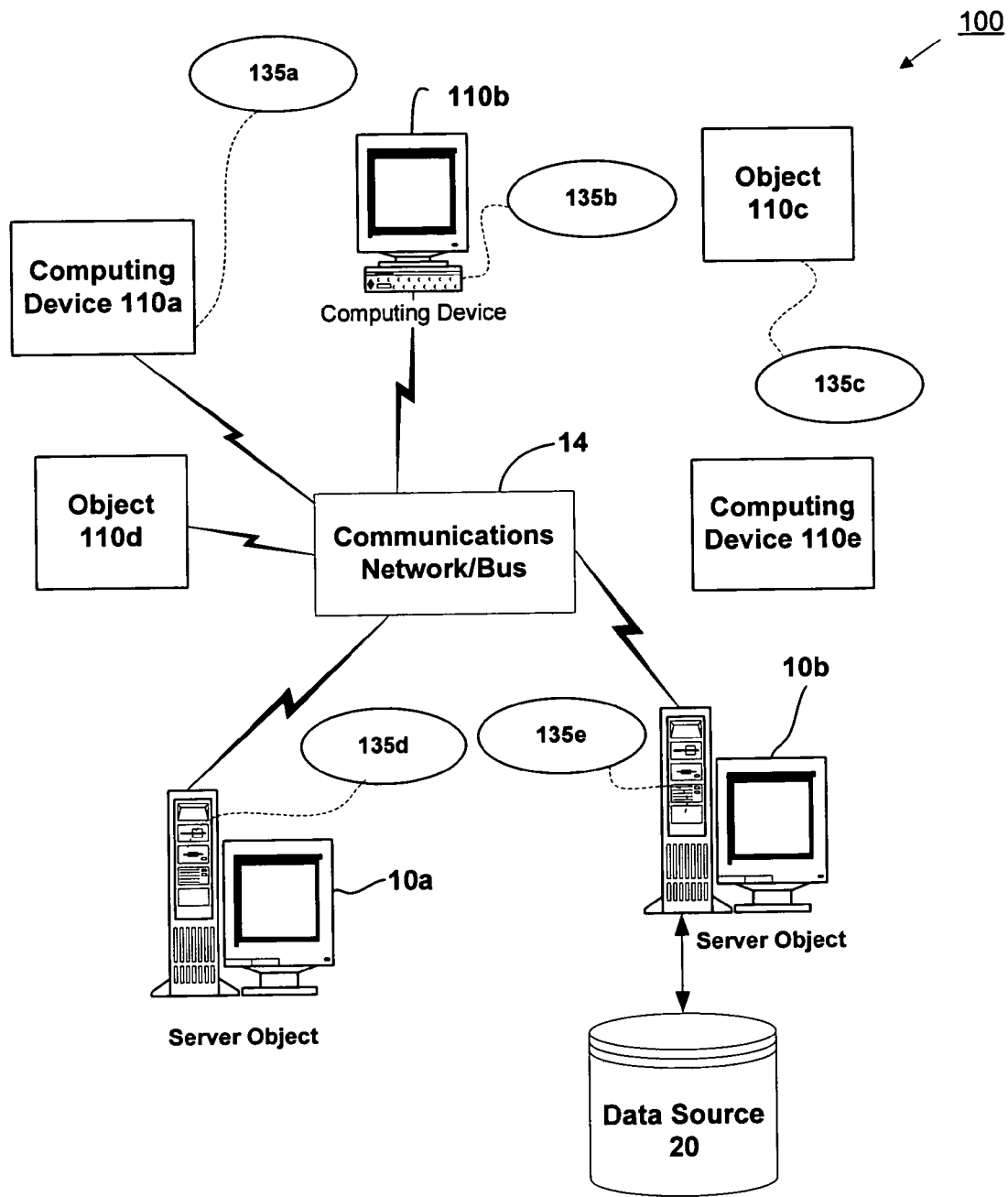
FIG. 1 is a schematic diagram of an exemplary networked or distributed computing environment.

The following detailed description is merely exemplary in nature and is not intended to limit the invention or the application and uses of the invention. As used herein, the word "exemplary" means "serving as an example, instance, or illustration." Any implementation described herein as "exemplary" is not necessarily to be construed as preferred or advantageous over other implementations. All of the implementations described below are exemplary implementations provided to enable persons skilled in the art to make or use the invention and are not intended to limit the scope of the invention which is defined by the claims.

Terminology

As used herein, the term "time to capacity" refers to the ratio of remaining capacity of a memory component to a growth rate of that memory component. In one implementation, the growth rate of the memory component can be a moving average of the growth rate.

As used herein, the term "memory component" refers to any client or server resource, such as, an Operating System (OS) disk drive, database components, non-disk database components, logical groupings of database "files" such as database file group used in Microsoft SQL servers, partitions, indexed or materialized views, or any other types of memory components.

Overview

The disclosed embodiments relate to a "time to capacity" alert mechanism which considers how fast (e.g., a rate of change) a memory component, such as a database component, a logical grouping of files (e.g., a file group) or a disk drive, is being consumed or filling up, and proactively tells operators when the memory component will eventually become full or "run out" of capacity. For example, a rate of capacity change (e.g., how fast a file group or disk drive is filling up) can be used to predict when a memory component will become full. An indication or warning can then be provided which indicates when a memory component will fill up. A database manager or operator can then decide how to remedy the situation (address capacity issues) before the capacity of the memory component is fully consumed (e.g., the memory component becomes full).

This mechanism can provide a proactive capacity planning tool which can improve worker productivity, and which can reduce and/or prevent costly business interruptions. Worker productivity can be improved, for instance, because knowing when a database will be full can allow operators to stop manually checking thousands of databases. Business interruptions can be avoided, for instance, because knowing when all the disk drives will be full can allow enough lead time to purchase larger drives or new servers.

Exemplary Networked and Distributed Environments

One of ordinary skill in the art can appreciate that the disclosed techniques and technologies for predicting when a memory component will become full and providing an indication of that prediction can be implemented in connection with any computer or other client or server device, which can be deployed as part of a computer network, or in a distributed computing environment. In this regard, the techniques and technologies for predicting when a memory component will become full and providing an indication of that prediction pertain to any computer system or environment having any number of memory or storage units, and any number of applications and processes occurring across any number of storage units or volumes, which may be used in connection with processes for a non-limiting implementation of techniques and technologies for predicting when a memory component will become full and providing an indication of that prediction. These techniques and technologies can be implemented in an environment with server computers and client computers deployed in a network environment or distributed computing environment, having remote or local storage. These techniques and technologies may also be applied to standalone computing devices, having programming language functionality, interpretation and execution capabilities for generating, receiving and transmitting information in connection with remote or local services. In a database environment, techniques and technologies for predicting when a memory component will become full and providing an indication of that prediction are particularly relevant to those computing devices operating in a network or distributed computing environment.

Distributed computing provides sharing of computer resources and services by exchanges between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the disclosed techniques and technologies for predicting when a memory component will become full and providing an indication of that prediction.

FIG. 1 provides a schematic diagram of an exemplary networked or distributed computing environment 100. The computing environment 100 comprises computing objects 10*a*, 10*b*, etc. and computing objects or devices 110*a*, 110*b*, 110*c*, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services, and may itself represent multiple interconnected networks. At least some of the objects 10*a*, 10*b*, etc. or 110*a*, 110*b*, 110*c*, etc. may contain an application that might make use of an API, or other object, software, firmware and/or hardware, to implement the disclosed techniques and technologies for predicting when a memory component will become full and providing an indication of that prediction.

It can also be appreciated that an object, such as 110*c*, may be hosted on another computing device 10*a*, 10*b*, etc. or 110*a*, 110*b*, etc. Thus, although the physical environment depicted may show the connected devices as computers, such illustration is merely exemplary and the physical environment may alternatively be depicted or described comprising various digital devices.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to techniques and technologies for predicting when a memory component will become full and providing an indication of that prediction.

The network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 1, computers 110*a*, 110*b*, etc. can be thought of as clients and computers 10*a*, 10*b*, etc. can be thought of as the server where server 10*a*, 10*b*, etc. maintains the data that is then replicated in the client computers 110*a*, 110*b*, etc., although any computer can be considered a client, a server, or both, depending on the circumstances.

A server is typically a remote computer system accessible over a remote or local network, such as the Internet. The client process may be active in a first computer system, and the server process may be active in a second computer system, communicating with one another over a communications modality, thus providing distributed functionality and allowing multiple clients to take advantage of the information-gathering capabilities of the server. Any software objects utilized pursuant to the techniques and technologies for predicting when a memory component will become full (and providing an indication of that prediction) may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications modality, e.g., client(s) and server(s) may be coupled to one another via TCP/IP connection(s) for high-capacity communication.

Thus, FIG. 1 illustrates an exemplary networked or distributed environment 100, with a server in communication with client computers via a network/bus 14, in which the techniques and technologies for predicting when a memory component will become full, and providing an indication of that prediction, may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device. It is thus contemplated that the present invention may apply to any computing device in connection with which it is desirable to implement techniques and technologies for predicting when a memory component will become full and providing an indication of that prediction.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment. Communications may be wired or wireless, where appropriate. Client devices 110a, 110b, 110c, 110d, 110e, etc. may or may not communicate via communications network/bus 14, and may have independent communications associated therewith. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data. Thus, the techniques and technologies for predicting when a memory component will become full, and providing an indication of that prediction, can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Figure 2:
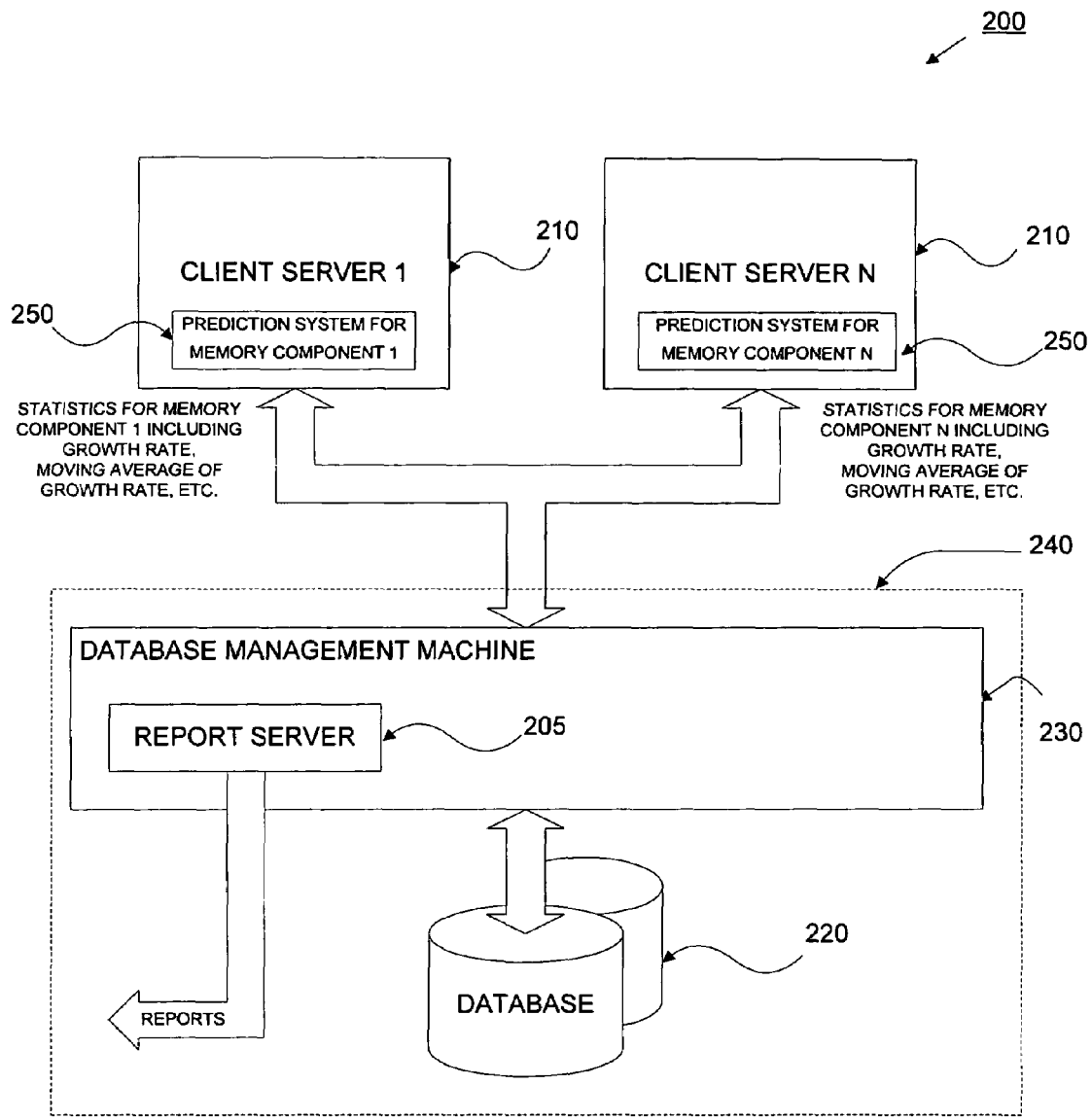
FIG. 2 is a schematic block diagram of a database system in accordance with an exemplary embodiment.

FIG. 2 is a schematic block diagram of a database system 200 in accordance with an exemplary embodiment.

The database system 200 comprises a data storage system 240 which may be accessed by one or more client servers 210. Examples of clients may include multi-purpose servers, servers from different networks and/or non-server computers.

Each client servers 210 could be implemented, for example, as part of a group of servers in a data center or a large enterprise network. The client servers 210 runs a scheduled task (e.g., SQL agent jobs) on a regular interval to gather statistics on how full each memory component (e.g., file group or disk drive) is at a given time. Each client server 210 has a prediction subsystem 250 that provides capacity prediction capabilities. Alternatively, the prediction subsystem 250 may be a part of the database management system 240. The prediction subsystem 250 may interface with a CPU (not shown), the data storage system 220, and/or and the system memory (not shown), to monitor capacity of the database storage system 220. The prediction system 250 can compute growth rates for a particular memory component. In one implementation, the client server 210 can also use the statistics to compute a moving average of the growth rate and other metrics useful in characterizing the growth behavior of the memory component at a particular time, how much capacity remains in the memory component, and when storage capacity of that memory component will become full. This information can be stored for a certain amount of time (e.g., a few days) in database table.

The database system 200 may include a database management machine 230 that facilitates interfacing to the database storage system 220 by the client servers 210. Database tables can store the centralized information and help format the reports. The database management machine 230 includes a report server 205 which generates reports on a regular basis. The report server 205 gathers information from each of the client servers 210 and formats it into a report. Among other things, these reports can include information, such as, lists of servers, disks, disk arrays or memory components ordered by their time to capacity, growth rate, or largest size attained in a given period of time. The reports can be in any of a number of different formats; however, a few specific examples will now be discussed.

For instance, one type of memory component report displays a list of all memory components in a particular data center, sorted by the time to capacity which is the amount of time (e.g., number of days, hours minutes, seconds, etc.) before the memory component is full or should be expanded. For instance, these types of reports can be used, for example, to display a disk drive report which is a list of all the servers in the data center, in which the disk drive associated with each server is sorted by the time to capacity.

These types of reports can also be used, for example, in conjunction with file groups used, for example, in SQL servers. In this case, the memory component report can be referred to as a file group report and can be used to display a list of all file groups in the data center, sorted by the time to capacity before each file group is full or should be expanded.

Figure 3:
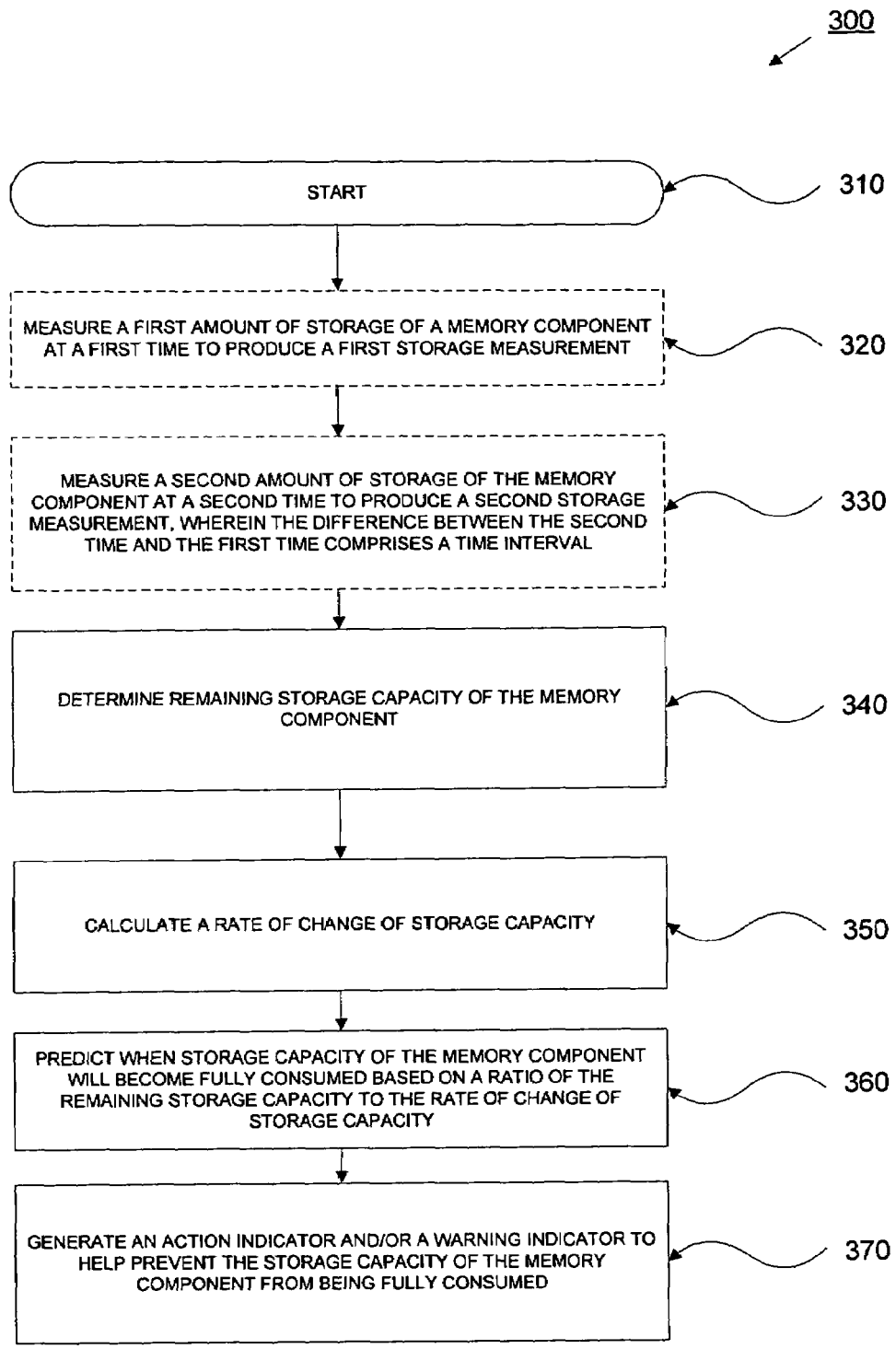
FIG. 3 is an exemplary non-limiting flow diagram for predicting when storage capacity of a memory component will become fully consumed and generating a warning indicator which indicates an amount of time remaining until the storage capacity will be fully consumed.
Figure 4:
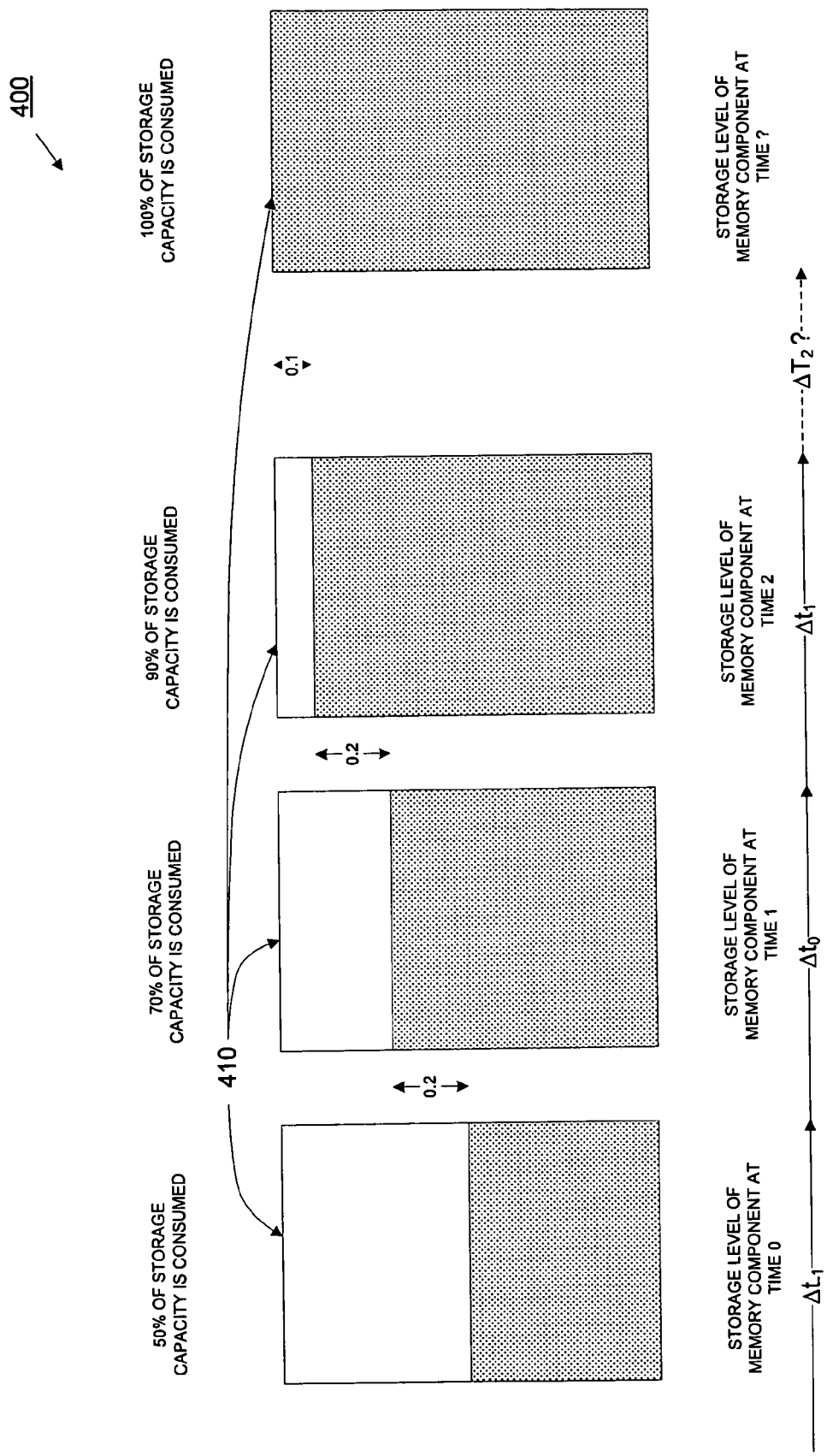
FIG. 4 is a block diagram showing the storage level of a memory component at different instances of time.

FIG. 3 illustrates an exemplary non-limiting flow diagram 300 for predicting when storage capacity of a memory component will become fully consumed and generating a warning indicator which indicates an amount of time remaining until the storage capacity will be fully consumed. To illustrate how these techniques can be applied in one exemplary scenario, FIG. 3 will be described with reference to FIG. 4. FIG. 4 is a block diagram showing the storage level of a memory component at different instances of time. The memory component may comprise, for instance, an Operating System (OS) disk drive, logical groupings of database "files" such as database file group used in Microsoft SQL servers, partitions, indexed or materialized views, or any other memory component.

The process starts at step 310. At step 320, a prediction engine can measure a first amount of consumed storage capacity of the memory component at a first time to produce a first storage measurement. For instance, at time 1 in FIG. 4, the storage level of the memory component is 70% consumed.

At step 330, the prediction engine can measure a second amount of consumed storage capacity of the memory component at a second time to produce a second storage measurement. For instance, at time 2 in FIG. 4, the storage level of the memory component is 90% consumed. The difference between the second time and the first time comprises a time interval ($\Delta t_1$,). In one implementation, the time interval ($\Delta t_0$, $\Delta t_1$,) between measurements can consistently be the same amount of time. This time interval can vary significantly depending upon the particular implementation, and could be a number of seconds, minutes, hours, days, etc. In the following example, it can be assumed that the time interval $\Delta t_1$ is one day. In other words, the amount of consumed storage capacity of the memory component can be measured on a daily basis.

It should be noted that steps 320 and 330 are optional as indicated by the dashed line rectangles and do not necessarily need to occur in all implementations. In some cases, the prediction engine has information about the remaining storage capacity at different instances in time and can use this information directly without actively taking measurements of the amount of consumed storage space.

At step 340, the prediction engine can determine the remaining storage capacity of the memory component. In some implementations, the prediction engine has information about the remaining storage capacity at different instances in time can may look this information up as needed. In other implementations, the prediction engine can determine the remaining storage capacity of the memory component based on the difference between a total storage capacity of the memory component and the second storage measurement. This can be a relative number based on the percentage of the storage space that is consumed in the memory component. For instance, at time 2 in FIG. 4, the remaining storage capacity of the memory component is 0.1 (e.g., the difference between total storage capacity (e.g., 1.0) and the second storage measurement (e.g., 0.9)). In one implementation, the remaining capacity of the memory component can comprise, for instance, the amount of free disk space available.

At step 350, the prediction engine can calculate a rate of change of the remaining storage capacity. In one implementation, the rate of change can be determined based on information known about the remaining storage capacity at different instance in time, and the time intervals between those time instances. For instance, in other implementations, the rate of change can be determined based on the first storage measurement (e.g., 70% or 0.7), the second storage measurement (e.g., 90% or 0.9), and the time interval ($\Delta t$). In FIG. 4, the rate of change of the remaining storage capacity is $0.2/\Delta t_1 (0.9-0.7$ divided by time interval ($\Delta t_1$)). The growth rate can be determined over a certain period of time (e.g., secondly, minutely, daily, weekly, monthly, etc.). In the example discussed above, if the time interval $\Delta t_1$ is one day, then the rate of change (e.g., the rate at which storage capacity of the memory component is being consumed) would be 20 percent of the total storage capacity per day.

At step 360, the prediction engine can predict or estimate an amount of time ($\Delta T_2$) remaining before the remaining storage capacity of the memory component will become fully consumed.

In one implementation, the amount of time ($\Delta T_2$) remaining before the remaining storage capacity of the memory component will become fully consumed can be predicted or estimated based on a ratio of the remaining storage capacity to the rate of change of the storage capacity. For instance, in the example shown in FIG. 4, the amount of time ($\Delta T_2$) remaining before the remaining storage capacity of the memory component will become fully consumed can be predicted or estimated to be $0.1:0.2/\Delta t_1$ or $\Delta t_1/2$ (the ratio of the remaining storage capacity to the rate of change of the storage capacity). In the example discussed above, if the time interval $\Delta t_1$ is one day, then the rate of change is 20 percent of the total storage capacity per day, and the amount of time ($\Delta T_2$) remaining before the remaining storage capacity of the memory component will become fully consumed can be predicted or estimated to be one-half day or 12 hours.

At step 370, the prediction engine can generate a message comprising an action indicator or a warning indicator and optionally a remedy indicator. The action indicator provides the method for expanding the memory component, or predicatively expanding the memory component automatically. For example, when time to capacity of a component reaches a predetermined amount of time or less, the action indicator can automatically expand the memory component, or provide a script to the operator which would expand the memory component. The warning indicator indicates an amount of time remaining until the storage capacity of the memory component will be fully consumed. In the examples described above, this warning indicator could specify a value of 12 hours ($\Delta T_2$) remaining before the remaining storage capacity of the memory component will become fully consumed. The remedy indicator indicates at least one action which should be taken to address the capacity issues before the storage capacity of the memory component will be fully consumed. For example, the remedy indicator can indicate the name of the server, database, memory component, disk drive or disk drive array, and the amount of time remaining before the resource runs out.

Figure 5:
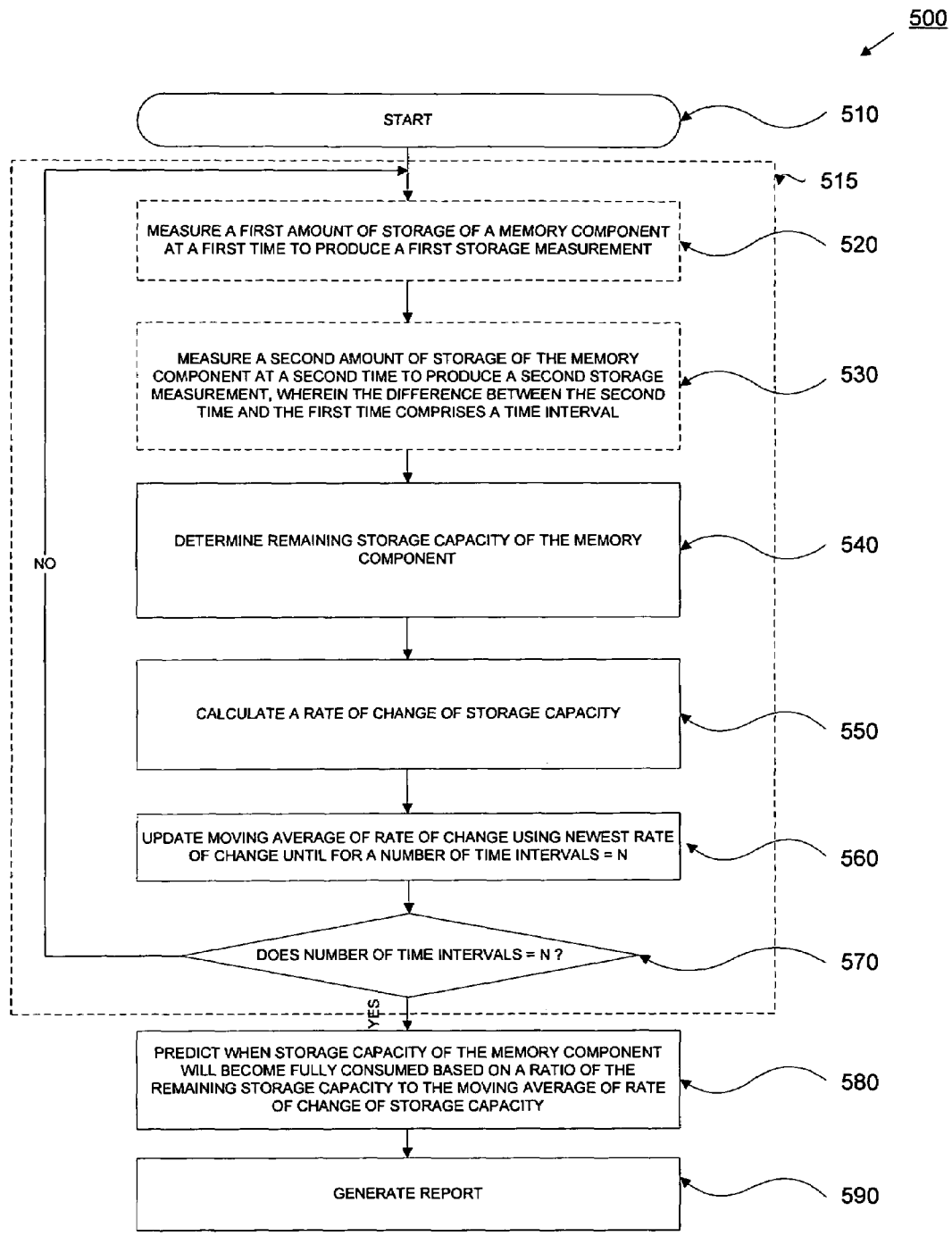
FIG. 5 is another exemplary non-limiting flow diagram for predicting when storage capacity of a memory component will become fully consumed and generating a warning indicator which indicates an amount of time remaining until the storage capacity will be fully consumed.

FIG. 5 illustrates another exemplary non-limiting flow diagram 500 for predicting when storage capacity of a memory component will become fully consumed and generating a warning indicator which indicates an amount of time remaining until the storage capacity will be fully consumed. To illustrate how these techniques can be applied in one exemplary scenario, FIG. 5 will be described with reference to FIG. 4. In this implementation, to help smooth out erratic fluctuations, the rate of change can be a moving average of the rate of change of the storage capacity, and therefore, the amount of time ($\Delta T_2$) remaining before the remaining storage capacity of the memory component will become fully consumed can be predicted or estimated based on a ratio of the remaining storage capacity to the moving average of the rate of change of the storage capacity. Given a sequence $\{a_i\}_{i=1}^{N}$, an $n$-moving average is a new sequence $\{s_i\}i=1^{N-n+1}$ defined from the $a_i$ by taking the average of subsequences of $n$ terms, $$s_i = \frac{1}{n} \sum_{j=1}^{i+R-1} \alpha_j. \tag{1}$$

So the sequences $S_n$ giving $n$-moving averages are $$S_2 = \frac{1}{2}(\alpha_1 + \alpha_2, \alpha_2 + \alpha_3, \ldots, \alpha_{R-1} + \alpha_Q) \tag{2}$$

$$S_3 = \frac{1}{3}(\alpha_1 + \alpha_2 + \alpha_3, \alpha_2 + \alpha_3 + \alpha_4, \ldots, \alpha_{R-2} + \alpha_{Q-1} + \alpha_Q). \tag{3}$$

and so on.

The process starts at step 510, and at step 520 at a first time, the prediction engine can measure a first amount of consumed storage capacity of the memory component to produce a first storage measurement. For instance, at time 1 in FIG. 4, the storage level of the memory component is 70% consumed.

At step 530 at a second time, the prediction engine can measure a second amount of consumed storage capacity of the memory component to produce a second storage measurement. For instance, at time 2 in FIG. 4, the storage level of the memory component is 90% consumed. The difference between the second time and the first time comprises a time interval ($\Delta t_1$). In one implementation, the time interval ($\Delta t_0$, $\Delta t_1$) between measurements can consistently be the same amount of time. This time interval can vary significantly depending upon the particular implementation, and could be a number of seconds, minutes, hours, days, weeks, months, years, etc. In the following example, it can be assumed that the time interval $\Delta t_1$ is one day. In other words, the amount of consumed storage capacity of the memory component can be measured on a daily basis.

As noted above, it should be appreciated that steps 520 and 530 are optional as indicated by the dashed line rectangles and do not necessarily need to occur in all implementations. In some cases, the prediction engine has information about the remaining storage capacity at different instances in time and can use this information directly without actively taking measurements of the amount of consumed storage space.

At step 540, the prediction engine can determine the remaining storage capacity of the memory component. Step 540 is similar to step 340 above and, for sake of brevity, will not be repeated.

At step 550, the prediction engine can calculate a rate of change of the remaining storage capacity. Step 550 is similar to step 350 above and, for sake of brevity, will not be repeated.

At step 560, the prediction engine updates the moving average of the rate of change of the storage capacity. This process continues for a number of intervals (N). The number of intervals (N) is implementation specific and varies based on the storage behavior of the memory component. For example, in some cases, a moving average based on five samples (N=5) may be adequate whereas in other cases it may be desirable to base the moving average on a larger or smaller number of samples. The number of samples used to determine the moving average tends to increase as the time interval ($\Delta t_0$, $\Delta t_1$) between measurements decreases.

At step 570, the prediction engine determines if the current moving average is based on enough samples. If not, then the process 500 loops back to step 520 and steps 520 through 570 repeat. The process continues to repeat until it is determined at step 570 that the current moving average is based on enough samples. The process 500 then proceeds to step 580.

At step 580, the prediction engine can predict or estimate an amount of time ($\Delta T_2$) remaining before the storage capacity of the memory component will become fully consumed. In this implementation, the amount of time ($\Delta T_2$) remaining before the remaining storage capacity of the memory component will become fully consumed can be predicted or estimated based on a ratio of the remaining storage capacity to the moving average of the rate of change of the storage capacity. As noted above, the number of rate of change samples used to determine the moving average can very significantly depending upon the particular implementation and nature of the memory component. For example, if the moving average is calculated based on six samples, and if the rates of change of the remaining storage capacity of those samples are $0.05/\Delta t_{-4}$, $0.2/\Delta t_{-3}$, $0.1/t_{-2}$, $0.0/\Delta t_{-1}$, $0.2/\Delta t_1$ over different time intervals $\Delta t_{-4}$, $\Delta t_{-3}$, $\Delta t_{-2}$, $\Delta t_{-1}$, $\Delta t_0$, $\Delta t_1$, respectively, and the different time intervals are equal (e.g., 1 day), then the moving average over the six time intervals would be $0.125/\Delta t_1$. As such, the amount of time ($\Delta T_2$) remaining before the remaining storage capacity of the memory component will become fully consumed can be predicted or estimated to be $0.1:0.125/\Delta t_1$ or approximately 19.2 hours.

At step 570, the prediction engine can generate a message comprising a warning indicator and optionally a remedy indicator. The warning indicator indicates an amount of time remaining until the storage capacity of the memory component will be fully consumed. In the examples described above, this warning indicator could specify a value of 19.2 hours ($\Delta T_2$) remaining before the remaining storage capacity of the memory component will become fully consumed. The remedy indicator indicates at least one action which should be taken to address the capacity issues before the storage capacity of the memory component will be fully consumed.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect" or "coupled to" used in describing or showing a relationship between different elements do not imply that a direct connection must be made between these elements. For example, two elements may be connected to each other electronically, logically, or in any other manner, through one or more additional elements, without departing from the scope of the invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiments and implementations.

It should also be understood that various changes can be made in the function and arrangement of elements without departing from the scope of the invention as set forth in the appended claims and the legal equivalents thereof. For instance, any user interface (UI), schema or algorithm would be a specific implementation of the prediction or estimation concepts described above. As such, we claim as our invention all such embodiments as may come within the scope and spirit of the following claims and equivalents thereto. Thus, the present invention is not intended to be limited to the embodiments shown herein but is to be accorded the widest scope consistent with the principles and novel features disclosed herein.

What is claimed:

1. A method, comprising:
   determining remaining storage capacity of the memory component;
   calculating a rate of change of the storage capacity;

calculating a moving average of the rate of change of the remaining storage capacity;

predicting when the remaining storage capacity of the memory component will be consumed based on a ratio of the remaining storage capacity to the calculated rate of change of the storage capacity; and predicting an amount of time before the remaining storage capacity of the memory component will be consumed based on a ratio of the remaining storage capacity to the moving average of the rate of change of the remaining storage capacity.

2. The method of claim 1, further comprising:

measuring a first amount of consumed storage capacity of a memory component at a first time to produce a first storage measurement;

measuring a second amount of consumed storage capacity of the memory component at a second time to produce a second storage measurement, wherein the difference between the second time and the first time comprises a time interval, and wherein the remaining storage capacity of the memory component comprises the difference between a total storage capacity of the memory component and the second storage measurement; and wherein calculating a rate of change of the storage capacity, comprises:

calculating a rate of change of the storage capacity based on the first storage measurement, the second storage measurement, and the time interval.

3. The method of claim 1, further comprising:

generating an action indicator, based on the prediction as to when the remaining storage capacity of the memory component will be consumed, wherein the action indicator indicates an action to be taken to prevent the remaining storage capacity of the memory component from being fully consumed.

4. The method of claim 3, further comprising:

automatically increasing the capacity of the memory component, in response to the action indicator, before the capacity of the memory component is fully consumed.

5. The method of claim 1, further comprising:

generating a message comprising: a warning indicator which indicates an amount of time remaining until the storage capacity of the memory component will be consumed.

6. The method of claim 5, wherein the message further comprises:

a remedy indicator which indicates at least one action to be taken to address the capacity issues before the storage capacity of the memory component will be consumed.

7. The method of claim 1, wherein the memory component comprises a database component comprising a logical grouping of database files.

8. The method of claim 1, wherein the memory component comprises an Operating System (OS) disk drive, wherein the remaining capacity of the memory component comprises the amount of free disk space available.

9. A computer readable medium comprising computer executable instructions for performing the method of claim 1.

10. An application programming interface comprising computer executable modules for carrying out the steps of claim 1.

11. An application programming interface for instructing a processing unit to perform the method of claim 1.

12. A memory management system stored on a computer-readable storage medium having computer-executable modules, comprising:

a predictor module which determines remaining storage capacity of the memory component, calculates a rate of change of the storage capacity, and estimates when the remaining storage capacity of the memory component will be consumed based on a ratio of the remaining storage capacity to the calculated rate of change of the storage capacity, wherein the predictor module calculates a moving average of the rate of change of the remaining storage capacity, and estimates when the remaining storage capacity of the memory component will be consumed based on a ratio of the remaining storage capacity to the moving average of the rate of change of the remaining storage capacity.

13. The memory management system of claim 12, further comprising:

a measurement module which measures a first amount of consumed storage capacity of a memory component at a first time to produce a first storage measurement, and measures a second amount of consumed storage capacity of the memory component at a second time to produce a second storage measurement, wherein the difference between the second time and the first time comprises a time interval, and wherein the remaining storage capacity of the memory component comprises the difference between a total storage capacity of the memory component and the second amount of consumed storage measurement, and wherein the predictor module calculates the rate of change of the storage capacity based on the first amount of consumed storage measurement, the second amount of consumed storage measurement, and the time interval, and estimates when the remaining storage capacity of the memory component will be consumed based on a ratio of the remaining storage capacity to the rate of change of the storage capacity.

14. The memory management system of claim 12, further comprising:

a message generator module which generates a warning indicator which indicates an amount of time remaining until the storage capacity of the memory component will be consumed.

15. The memory management system of claim 13, wherein the message generator further generates a remedy indicator which indicates at least one action to be taken to address the capacity issues before the storage capacity of the memory component will be consumed.

16. The memory management system of claim 12, wherein the memory component comprises a file group.

17. The memory management system of claim 12, wherein the memory component comprises disk drive, and wherein the remaining capacity of the memory component comprises the amount of free disk space available.

* * * * *